(12) United States Patent
Wachob et al.

(10) Patent No.: US 11,181,699 B2
(45) Date of Patent: Nov. 23, 2021

(54) FIBER OPTIC CONNECTOR ASSEMBLY

(71) Applicant: Antronix Inc., Cranbury, NJ (US)

(72) Inventors: David Earl Wachob, New Hope, PA (US); Earl Pearson, Knoxville, TN (US)

(73) Assignee: ANTRONIX INC., Cranbury, NJ (US)

( * ) Notice: Subject to any disclaimer, the term of this patent is extended or adjusted under 35 U.S.C. 154(b) by 19 days.

(21) Appl. No.: 16/657,199

(22) Filed: Oct. 18, 2019

(65) Prior Publication Data

US 2020/0124800 A1    Apr. 23, 2020

Related U.S. Application Data

(60) Provisional application No. 62/748,107, filed on Oct. 19, 2018.

(51) Int. Cl.
*G02B 6/38* (2006.01)
*G02B 6/42* (2006.01)
*G02B 6/48* (2006.01)

(52) U.S. Cl.
CPC ......... *G02B 6/3869* (2013.01); *G02B 6/3879* (2013.01); *G02B 6/3897* (2013.01); *G02B 6/3825* (2013.01); *G02B 6/3887* (2013.01)

(58) Field of Classification Search
CPC .. G02B 6/3869; G02B 6/3879; G02B 6/3897; G02B 6/3887; G02B 6/3825; G02B 6/4448; G02B 6/4277
See application file for complete search history.

(56) References Cited

U.S. PATENT DOCUMENTS

| 4,822,130 | A | * | 4/1989 | Maranto | G02B 6/3835 |
|---|---|---|---|---|---|
| | | | | | 385/138 |
| 6,542,674 | B1 | | 4/2003 | Gimblet | |
| 6,546,175 | B1 | | 4/2003 | Wagman et al. | |
| 6,648,520 | B2 | | 11/2003 | McDonald et al. | |
| 6,714,710 | B2 | | 3/2004 | Gimblet | |

(Continued)

OTHER PUBLICATIONS

"Waterproof Fiber Optic Panel Mount Simplex SC Connector"— http://www.networktechinc.com/cgi-bin/keemux/fiber-s-sc-wtp-cs.html (Website) (undated; accessed Oct. 9, 2019).

(Continued)

*Primary Examiner* — Ryan A Lepisto
*Assistant Examiner* — Erin D Chiem
(74) *Attorney, Agent, or Firm* — Volpe Koenig

(57) ABSTRACT

In one embodiment, a fiber optic connector assembly is provided that includes an adapter defining a first through opening in which a coupler is arranged. A sleeve defines a second through opening dimensioned to receive the adapter, and the sleeve includes a first threading on an axial end. The first threading is configured to matingly engage with a corresponding second threading defined within an opening of a junction housing. A retention assembly is provided between the adapter and the sleeve, and the retention assembly axially fixes the adapter relative to the sleeve such that the adapter is rotatable relative to the sleeve. The embodiments disclosed herein generally protect against electromagnetic interference (EMI), shield against radiofrequency (RF) signals, prevent attenuation of fiber optic cables due to varying rotational capability, and protect the connector assembly from debris and moisture.

16 Claims, 19 Drawing Sheets

(56) References Cited

U.S. PATENT DOCUMENTS

| | | | |
|---|---|---|---|
| 6,785,450 | B2 | 8/2004 | Wagman et al. |
| 6,899,467 | B2 | 5/2005 | McDonald et al. |
| 7,090,406 | B2 | 8/2006 | Melton et al. |
| 7,090,407 | B2 | 8/2006 | Melton et al. |
| 7,111,990 | B2 | 9/2006 | Melton et al. |
| 7,113,679 | B2 | 9/2006 | Melton et al. |
| 7,467,896 | B2 | 12/2008 | Melton et al. |
| 7,785,015 | B2 | 8/2010 | Melton et al. |
| 7,881,576 | B2 | 2/2011 | Melton et al. |
| 7,918,609 | B2 | 4/2011 | Melton et al. |
| 9,239,441 | B2 | 1/2016 | Melton et al. |
| 9,513,444 | B2 | 12/2016 | Barnette et al. |
| 9,964,713 | B2 | 5/2018 | Barnette et al. |
| 2003/0063867 | A1 | 4/2003 | McDonald et al. |
| 2014/0147082 | A1* | 5/2014 | Lee .................. G02B 6/3825 |
| | | | 385/78 |
| 2016/0154186 | A1 | 6/2016 | Gimblet et al. |
| 2017/0139158 | A1* | 5/2017 | Coenegracht ........ G02B 6/3821 |
| 2018/0239094 | A1 | 8/2018 | Barnette et al. |

OTHER PUBLICATIONS

"4 Adapter Slot, 4 Splice Termination Box, 2 Ports—Fibertronics"—https://fibertronics.com/4-adapter-slot-4-splice-termination-box-2-ports (Website) (undated; accessed Oct. 9, 2019).

"Reliability at the Core Hardened Connectors in the Outside Plant"—https://www.corning.com/catalog/coc/documents/brochures/CRR-535-AEN.pdf (Website) (Sep. 2016.).

* cited by examiner

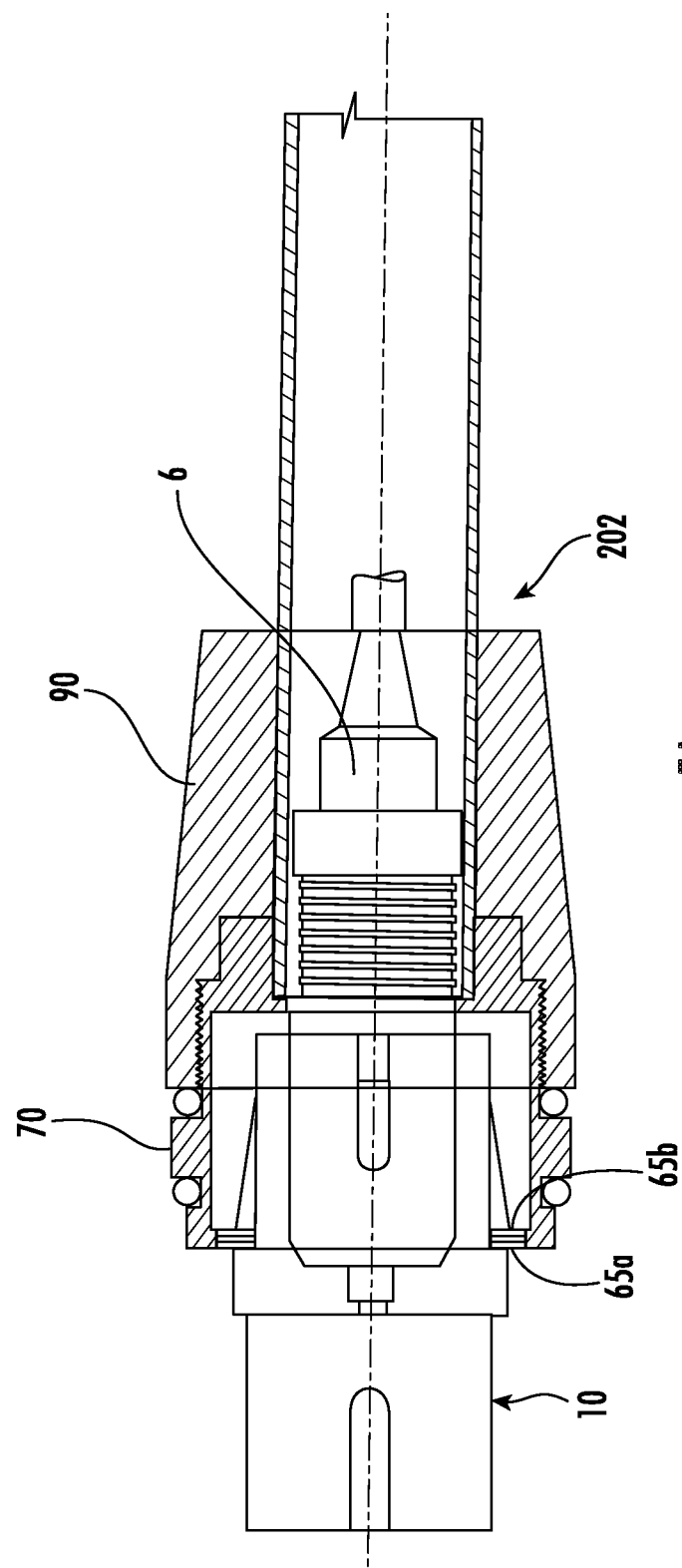

FIBER OPTIC CONNECTOR ASSEMBLY

INCORPORATION BY REFERENCE

This application claims priority to U.S. Provisional Patent Application No. 62/748,107, filed on Oct. 19, 2018, which is incorporated by reference as if fully set forth herein.

FIELD OF INVENTION

The present disclosure relates to cable connector assemblies, and more specifically relates to fiber optic cable connector assemblies.

BACKGROUND

The majority of fiber optic connectors used in telecommunications and other industries are directed to connecting and/or splicing fiber optic cables. As such, there are little if any requirements to prevent radio frequency (RF) signals from either entering or exiting the connector assembly and/or area, because fiber optic signals only transport optical signals. In view of this, fiber optic connectors are typically formed from plastic or other non-metal materials, which do not provide RF shielding.

When the devices connected to these fiber optic connector assemblies and/or fiber optic cables convert optical signals to RF signals, or are connected to devices that generate, route or otherwise contain RF signals, then the existing plastic materials used in these fiber optic connector assembly do not provide adequate RF shielding, to either prevent unwanted RF signals from exiting or entering the fiber optic connector assembly.

Another problem with existing fiber optic connector assemblies is that the associated installation is very time consuming and expensive, as oftentimes the fiber optic cable itself must be spliced and polished to exacting specifications in order to be installed within the fiber optic cable assembly. This requires a properly trained technician using sophisticated and complex tools and equipment. The problems associated with this installation is further exacerbated if the fiber optic connector assembly is located in difficult to reach locations, such as at the top of a telephone pole, or must be installed in extreme weather situations, such as severe heat or cold, or precipitation.

FIG. 1 illustrates an exemplary junction housing 5 according to the prior art with a coupler 10 positioned inside of the junction housing 5. This type of configuration has significant disadvantages because it requires installation personnel to access the inside of the junction housing 5. Accessing the inside of the junction housing 5 requires removal of a shell or cover (not illustrated), then making the necessary connections inside of the junction housing 5, and properly replacing the shell or cover to complete the installation. It would be desirable to bypass these additional steps required to access the inside of the junction housing 5 in order to save time, money, and effort.

Existing fiber optic coupler assemblies suffer from many deficiencies, and it would be desirable to provide a simpler, more reliable, quicker, and cheaper method and configuration for connecting two fiber optic cable ends relative to a junction housing.

SUMMARY

Multiple embodiments of a fiber optic connector assembly are disclosed herein that provide a "quick connect" arrangement between the fiber optic connector assembly positioned in a junction housing, improved protection against electromagnetic interference (EMI) and prevention of unwanted RF signals, protection against the environment (i.e. moisture, debris), and/or full rotation or at least some degree of rotation between the fiber optic connector assembly and the junction housing during an intermediate installation step.

Each of the embodiments disclosed herein utilize a coupler, which is also commonly known and interchangeably referred to as a female subscriber or standard connector (SC). For example, the coupler can be a female-to-female coupler adapted to receive male fiber optic cable ends on either end of the coupler.

In one embodiment, the fiber optic connector assembly includes an adapter defining a first through opening in which the coupler is arranged. A sleeve defines a second through opening dimensioned to receive the adapter, and the sleeve includes a first threading on an axial end. The first threading is configured to matingly engage with a corresponding second threading defined within an opening of a junction housing. A retention assembly is provided between the adapter and the sleeve, and the retention assembly axially fixes the adapter relative to the sleeve such that the adapter is rotatable relative to the sleeve.

In another embodiment, the fiber optic connector assembly includes an adapter defining a first through opening dimensioned to receive the coupler. The adapter includes a first threading configured to matingly engage with a corresponding second threading defined on a junction housing. In this arrangement, the adapter and coupler are joined to each other such that they rotate together. Once the adapter engages with the junction housing, then the coupler is rotationally fixed relative to the junction housing.

In another embodiment, the fiber optic connector assembly includes at least one washer including a radially inner edge having a profile complementary to an outer surface of the coupler, and a radially outer edge having a circular profile and adapted to be freely rotatable within a connector body. The at least one washer allows the coupler to rotate relative to the connector body. The at least one washer preferably includes two washers.

In another embodiment, the fiber optic connector assembly includes a rotational clip defining a through opening dimensioned to receive the coupler. The rotational clip includes a radially inwardly extending flange configured to engage with an outer surface of the coupler such that the coupler and the rotational clip are fixed to each other and the coupler and the rotational clip rotate together. The rotational clip is dimensioned to be inserted within a connector body that is fixed to a junction housing such that the rotational clip is rotatable relative to connector body and the junction housing.

Additional embodiments are disclosed herein.

BRIEF DESCRIPTION OF THE DRAWINGS

Various embodiments of the present invention are described below with reference to the accompanying drawings, in which like components or devices are identified by the same reference numeral. However, these embodiments are not meant to be limited by what is shown in the drawings as briefly described immediately below. In the drawings:

FIG. 5A is a cross section view of a fiber optic connector assembly with a fiber optic cable connected to the coupler according to another embodiment.

DETAILED DESCRIPTION OF THE PREFERRED EMBODIMENTS

Figure 1:
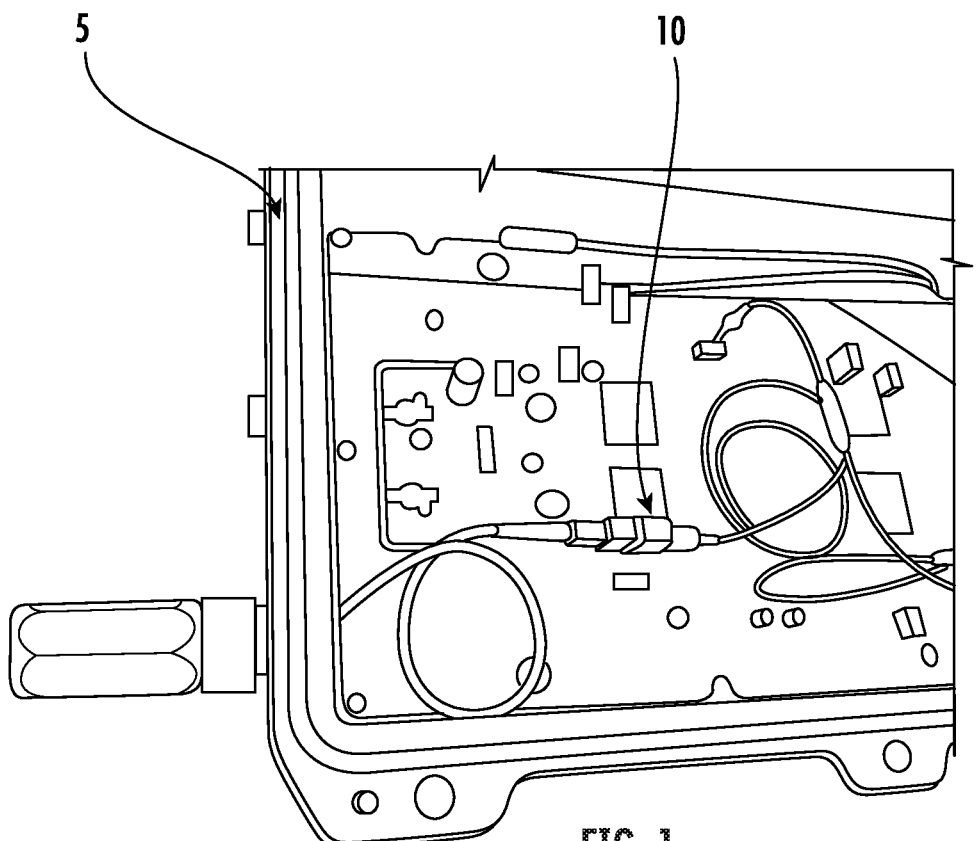
FIG. 1 is a perspective view of a junction housing with a fiber optic cable connected to a coupler according to the state of the art.
Figure 2:
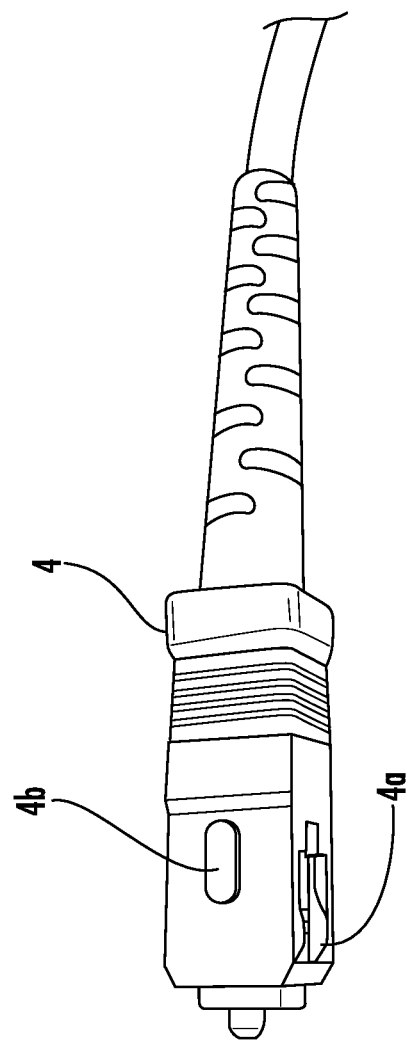
FIG. 2 is a perspective view of a standard coupler and a fiber optic cable end prior to insertion of the cable end inside of the coupler.
Figure 2:
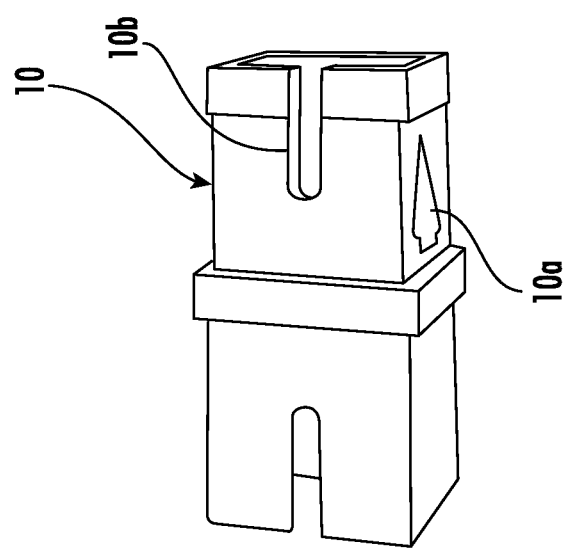

Certain terminology is used in the following description for convenience only and is not limiting. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 3A-3G, a fiber optic connector assembly 2 is disclosed. The assembly 2 includes a coupler 10 configured to lockingly engage a first fiber optic cable end 4 at a first end 12 and a second fiber optic cable end 6 at a second end 14. The fiber optic cables can be provided between a content/service provider and consumers. One of ordinary skill in the art would understand based on the present disclosure that the coupler 10 can be used between any two fiber optic cable ends. Additionally, one of ordinary skill in the art would understand that the connector assemblies disclosed herein can be adapted to be used with other types of cables besides fiber optic cables.

The term coupler 10 as used herein generally refers to any component configured to join two cables to each other. The coupler 10 is illustrated as a female-to-female coupler, but other types of couplers could be used. The coupler 10 includes the same features throughout each of the embodiments disclosed herein. The coupler 10 includes a protrusion 11, which is generally positioned in a medial region of the coupler 10. The protrusion 11 generally has a rectangular profile and defines abut surfaces on both axial ends, which are used in various embodiments herein to serve as stops for other components. The coupler 10 further includes a locking prong or clip 10a, and a slot 10b, which are both generally configured to engage with a cable end to retain the cable end with the coupler 10.

As disclosed herein, the embodiments in FIGS. 3A-3G, 5A-5D, and 6A and 6B each allow for some degree of rotation between a component that directly engages the coupler 10 (i.e. adapter 20, rotational clip 50, washers 65a/65b) and the junction housing 5. Each of these embodiments permit some degree of rotational movement between the coupler 10 (which is engaged with the fiber optic cable ends 4, 6) and the junction housing 5. Distinctions between these embodiments, as well as a rotationally fixed embodiment illustrated in FIGS. 4A-4D are disclosed in more detail herein.

Figure 3A:
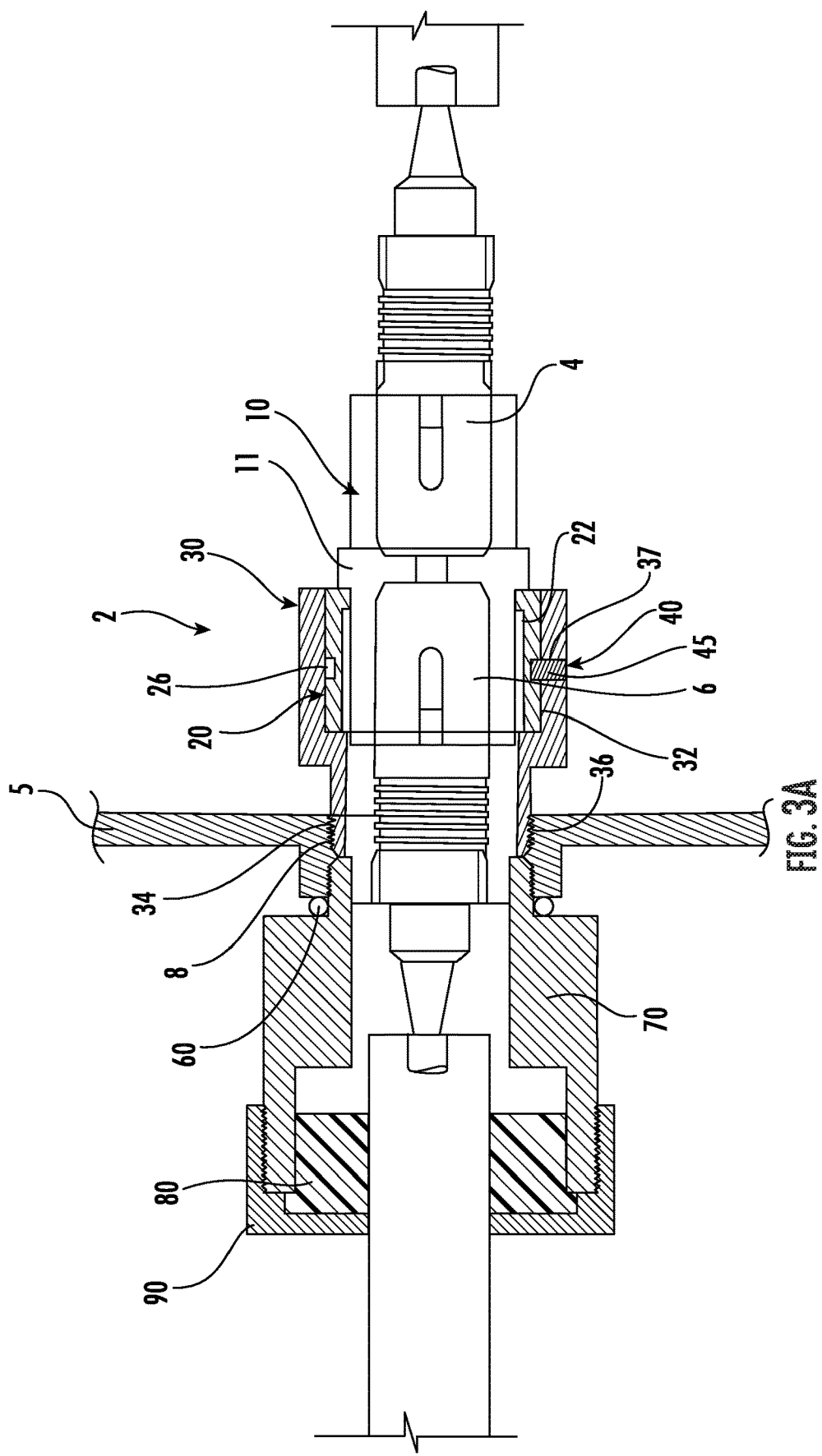
FIG. 3A is a cross section view of a fiber optic connector assembly installed in a junction box with a fiber optic cable connected to the coupler according to an embodiment.
Figure 3B:
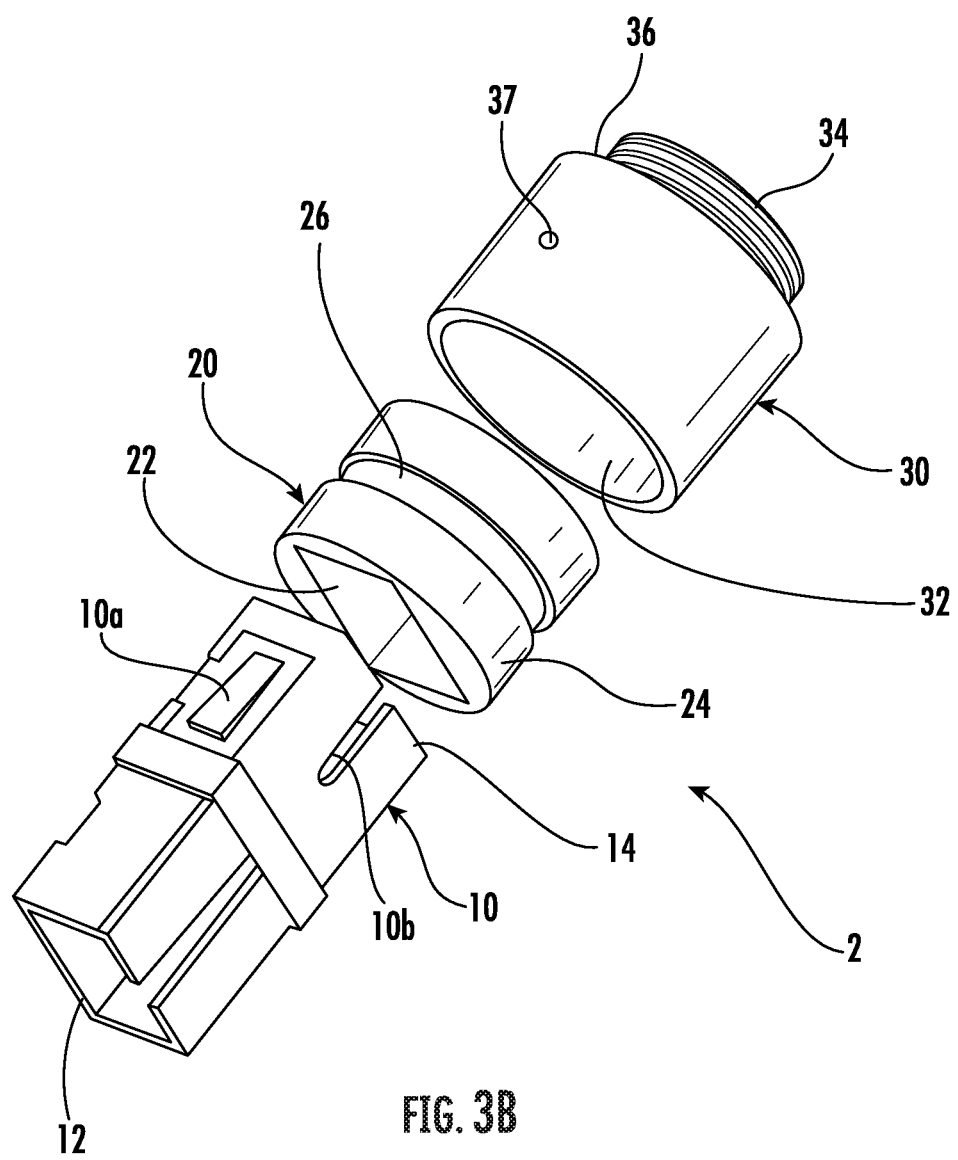
FIG. 3B is an exploded perspective view of the fiber optic connector assembly of FIG. 3A.

Returning to the embodiment of FIGS. 3A-3G, the assembly 2 includes an adapter 20 defining a first through opening 22 in which the coupler 10 is arranged. As used herein, the term through opening means an opening defining a passage that is at least partially open or exposed on both axial ends. The coupler 10 is inserted inside of the first through opening 22, and the complementary profiles of the outer surface of the coupler 10 and the first through opening 22 ensures that the coupler 10 and the adapter 20 are rotationally fixed, i.e. the components are fixed such that the coupler 10 and adapter 20 rotate with each other. As shown in FIG. 3B, for example and without limitation, the first through opening 22 can be rectangular or box-shaped such that it is complementary to the generally rectangular or box-shaped coupler 10. The connection between the coupler 10 and the adapter 20 can also provide some degree of axial fixation due to a press-fit or interference fit between the two components. Additionally, the locking prong 10a can secure the coupler 10 within the adapter 20. Although the complementary profiles are generally illustrated as having a rectangular or box-shaped profile, one of ordinary skill in the art would understand based on the present disclosure that the shapes can be modified. In one embodiment, the coupler 10 directly engages the adapter 20 and no further or additional securing means are required to fix these components to each other.

The connector assembly 2 includes a sleeve 30 defining a second through opening 32 dimensioned to receive the adapter 20. The sleeve 30 includes a first threading 34 on an axial end 36, and the first threading 34 is configured to matingly engage with a corresponding second threading 8 defined within an opening of a junction housing 5. The opening of the junction housing 5 is also referred to as a bunghole in the industry.

In one embodiment, at least one of the adapter 20 or the sleeve 30 are metallic. Preferably, the adapter 20 is formed from plastic and the sleeve 30 is metallic. The metallic sleeve 30 ensures that EMI is reduced and prevents RF signals from either entering or exiting the connector assembly. In one embodiment, the sleeve 30 is formed from aluminum, steel, or brass. One of ordinary skill in the art would understand that the materials can vary depending on the specific requirements of the connector assembly.

As shown in FIG. 3A, the adapter 20 is completely surrounded by the sleeve 30 such that an axial end of these two components (shown on the right side of FIG. 3A) are aligned with each other, and no portion of the adapter 20 is radially exposed due to the sleeve 30 encapsulating the adapter 20. As shown in FIG. 3A, the axial ends of the adapter 20 and the sleeve 30 are aligned with the protrusion 11 of the coupler 10.

The fiber optic connector assembly 2 also includes a retention assembly 40 provided between the adapter 20 and the sleeve 30. The retention assembly 40 axially fixes the adapter 20 relative to the sleeve 30 such that the adapter 20 is rotatable relative to the sleeve 30 but is fixed in the axial direction. The term axially fixes (including derivatives thereof) is used herein to mean two components are fixed in an axial direction, and not necessarily rotationally fixed to each other.

In one embodiment, a rotational limiter is arranged between the adapter 20 and the sleeve 30 to limit the degree of rotation between the adapter 20 and the sleeve 30. One of ordinary skill in the art would understand from the present disclosure that the rotational limiter can be embodied according to a number of varying configurations, such as a detent/pawl arrangement, groove/biasing element arrangement, clip ring/recess arrangement, bearing assembly, and/or any combination thereof.

As shown in FIGS. 3A-3G, the retention assembly 40 preferably consists of: a circumferential groove 26 defined on the adapter 20, a through hole 37 defined on the sleeve 30, and a fixing element 45 extending within both the circumferential groove 26 and the through hole 37.

Figure 3C:
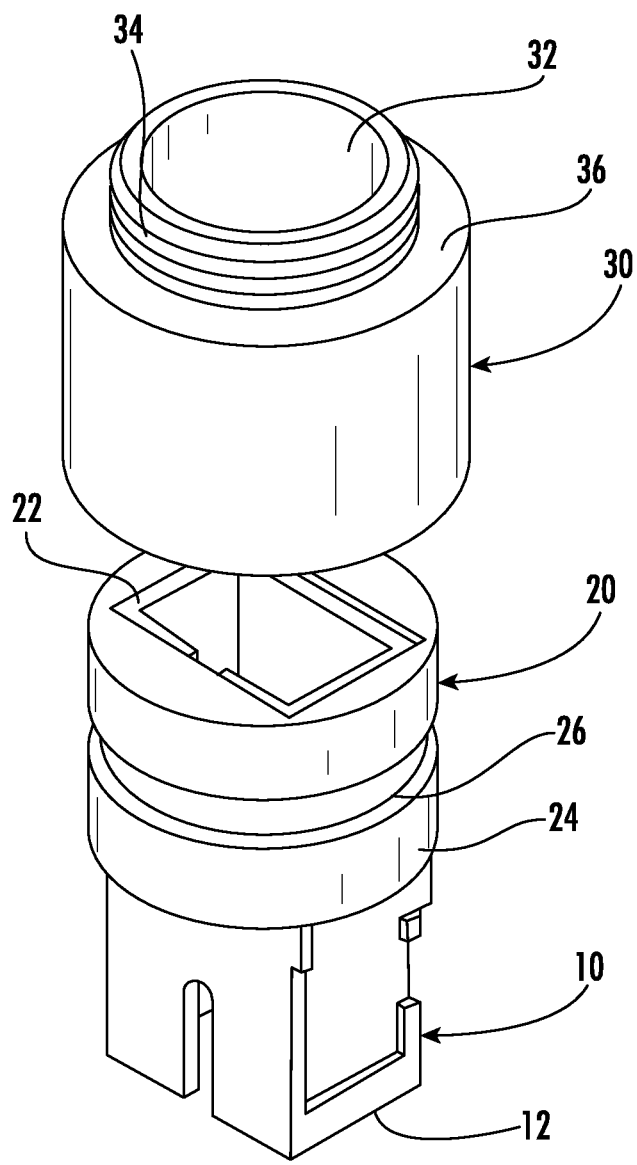
FIG. 3C is a top perspective view of the fiber optic connector assembly of FIGS. 3A and 3B in a partially assembled state.
Figure 3D:
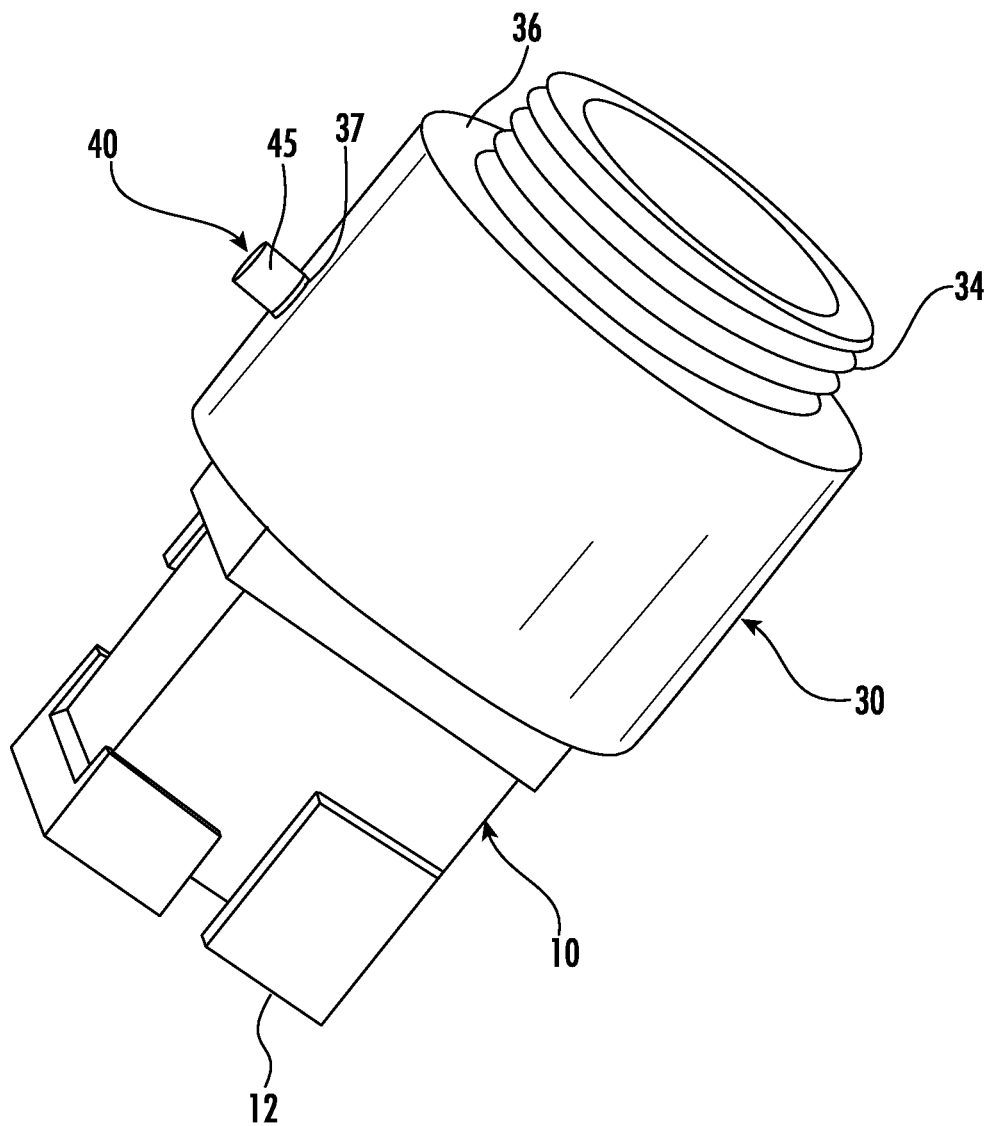
FIG. 3D is side perspective view of the fiber optic connector assembly of FIGS. 3A-3C in a partially assembled state.
Figure 3E:
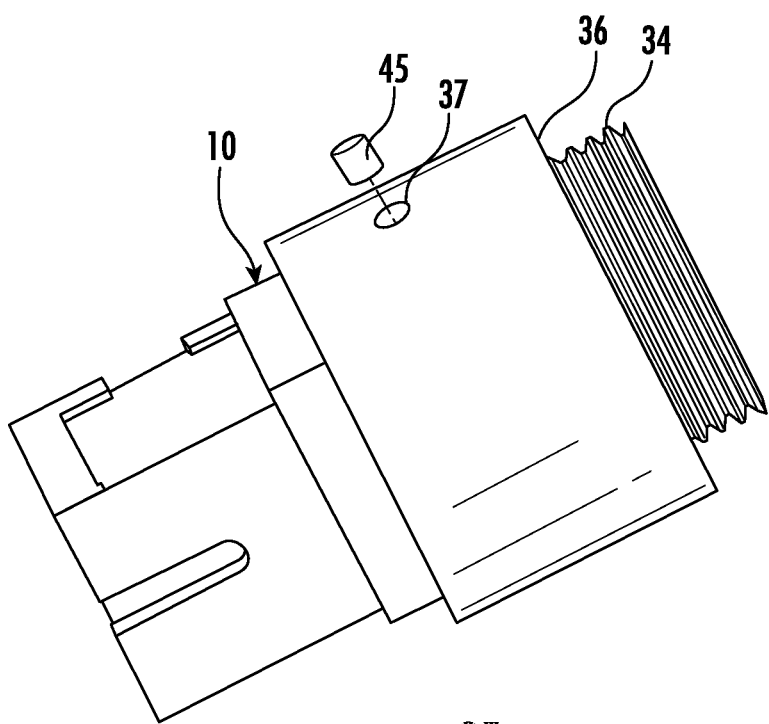
FIG. 3E is another side perspective view of the fiber optic connector assembly of FIGS. 3A-3D in a partially assembled state.
Figure 3F:
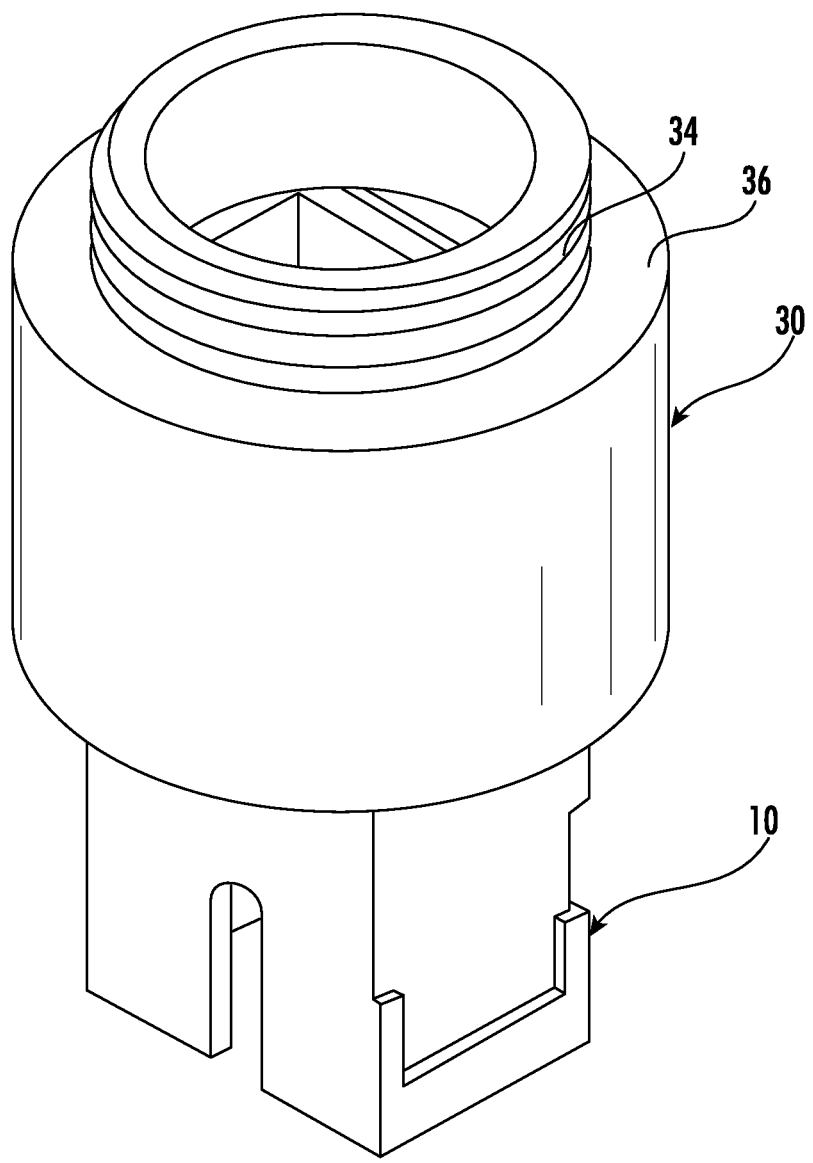
FIG. 3F is a top perspective view of the fiber optic connector assembly of FIGS. 3A-3E in a partially assembled state.
Figure 3G:
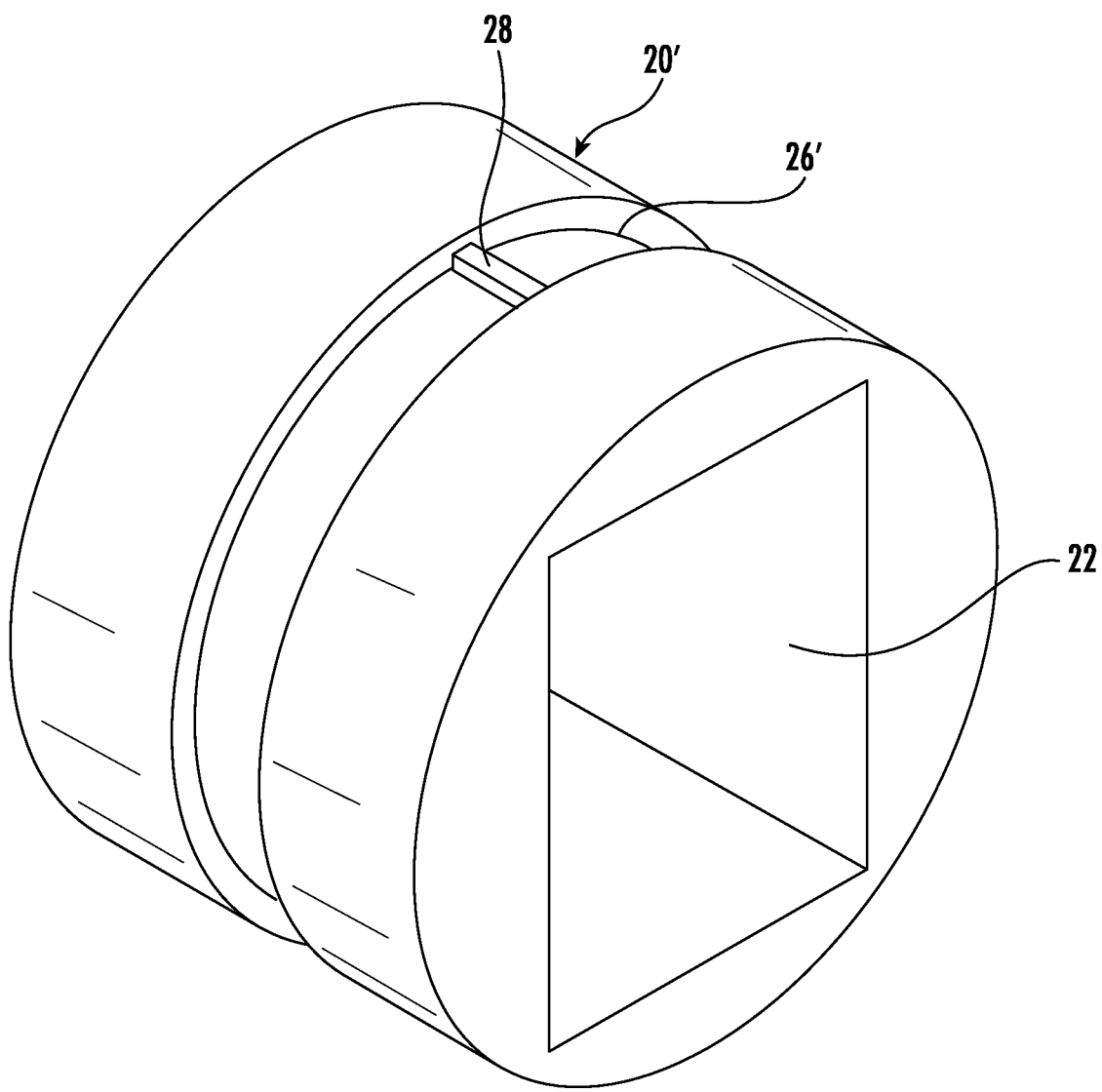
FIG. 3G is a perspective view of another embodiment of an adapter of the fiber optic connector assembly of FIGS. 3A-3F.

The circumferential groove 26 on the adapter 20 can have varying profiles and shapes. In one embodiment, the circumferential groove 26 is arranged in a medial portion of the adapter 20. In FIGS. 3B and 3C, the circumferential groove 26 is completely smooth and has a constant or uniform flat profile. In contrast, the circumferential groove 26' of FIG. 3G has an irregular or non-uniform circumferential profile. The circumferential groove 26' can include a projection 28 extending radially outward from the radially outer surface of the adapter 20'. This projection 28 is configured to serve as a rotational limiter or stop for the fixing element 45. Depending on the exact configuration, rotation of the adapter 20' relative to the sleeve 30 can be limited to less than 360 degrees. In one embodiment, this rotation is limited to less than 355 degrees, which is based on the circumferential extent of the projection 28. In embodiments without the projection 28, the adapter 20 and the sleeve 30 can freely rotate relative to each other. Limiting rotation of the adapter 20, 20' and the coupler 10 helps prevent damage to fiber optic cables held by the coupler 10.

Although the fixing element 45 is illustrated as a pin, one or ordinary skill in the art would understand that other fixing arrangements could be used, such as a set screw, ball bearing, etc.

In a partially installed state or intermediate installed state, the sleeve 30 is screwed into the junction housing 5 via the first threading 34 matingly engaging with the second threading 8, such that at least the coupler 10 and the adapter 20 are rotatable relative to the sleeve 30. Relative rotation between the coupler 10-adapter 20 combination within the sleeve 30 can be permitted temporarily during this partially installed state, and only until a seal 80 and cap 90 are later installed, resulting in a fully installed state. As used herein, the term partially installed state or intermediate installed state refers to a condition in which the coupler 10 is joined to the adapter 20/sleeve 30; rotational clip 50; and washers 65a, 65b. The term fully installed state refers to a later condition in which additional components, such as the seal 80 and cap 90 are installed.

The seal 80 is generally a plastic or rubber grommet, and can have a truncated frusto-conical or tapered profile. The cap 90 is generally a metal component including a threading that mates with the corresponding threading formed on the connector body 70 (or other component). The seal 80 and cap 90 ensure that an exposed axial end of the assembly is completely sealed and secured in place.

As shown in FIG. 3A, an axial end of the connector body 70 abuts the axial end 36 of the sleeve 30 (within the junction housing 5 opening) in the fully installed state. Once the seal 80 engages around the radial outer surface of the fiber optic cable and the cap 90 is tightened, rotation of fiber optic cable is limited due to the seal 80 gripping and applying a radially compressive force to the radial outer surface of the fiber optic cables. As a result, the coupler 10, which is fixed to the fiber optic cables, is also rotationally limited in the fully installed state.

As shown in FIG. 3A, a majority of the fiber optic connector assembly 2 is external from the junction housing 5. As used herein, the term majority means more than 50% of the fiber optic connector assembly 2 is external from the junction housing 5, and more preferably means more than 90% of the fiber optic connector assembly 2 is external from the junction housing 5. As shown in FIG. 3A, only the axial end 36 of the sleeve 30 is inserted within the junction housing 5, which is required so that the threading 34 can engage the corresponding threading 8 on the junction housing 5.

One of ordinary skill in the art would understand that the configuration of the fiber optic connector assembly 2 relative to the junction housing 5 can be reversed, such that the fiber optic connector assembly 2 is external from the junction housing 5.

Figure 4A:
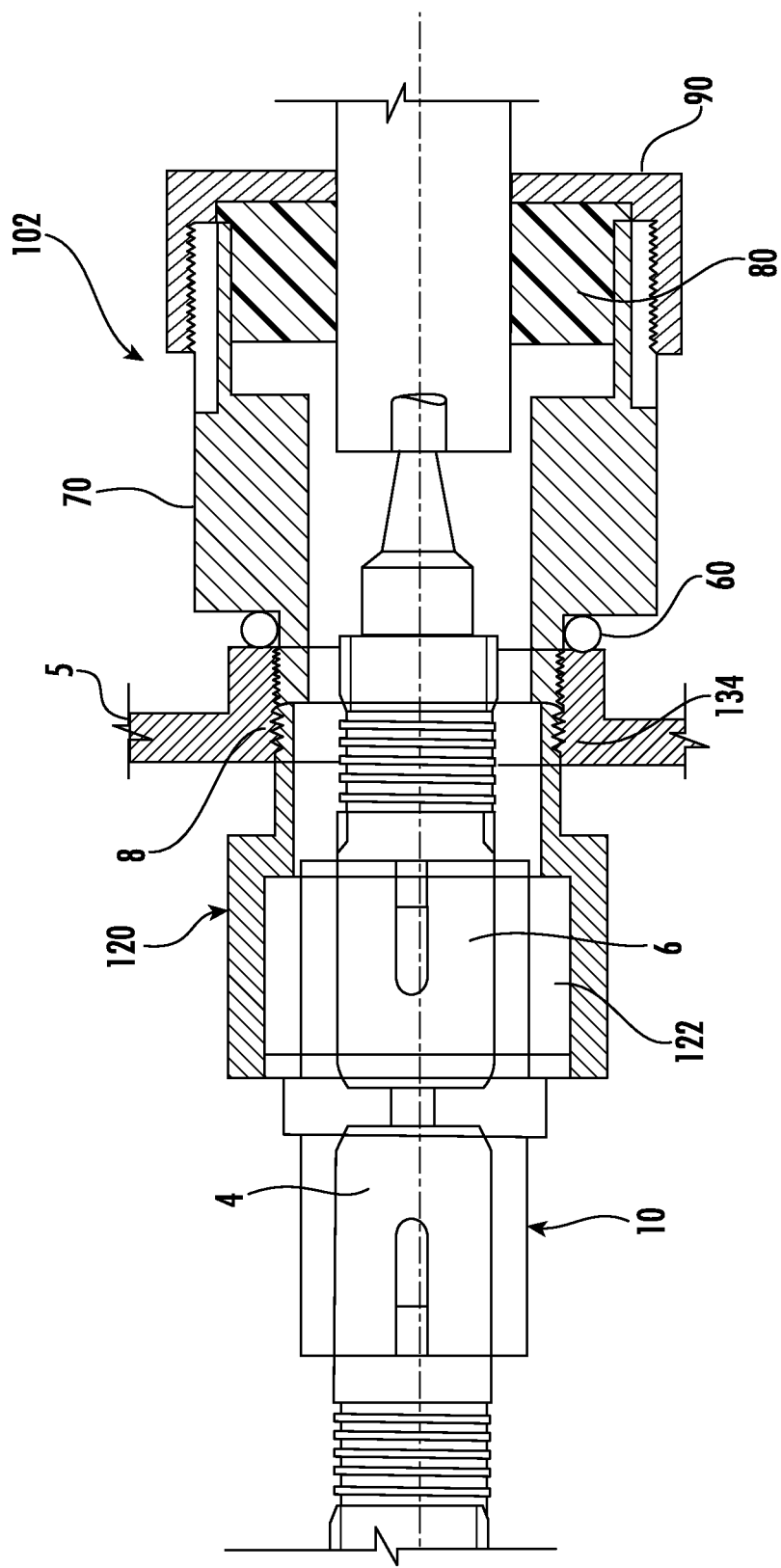
FIG. 4A is a cross section view of a fiber optic connector assembly installed in a junction box with a fiber optic cable connected to a coupler according to another embodiment.
Figure 4B:
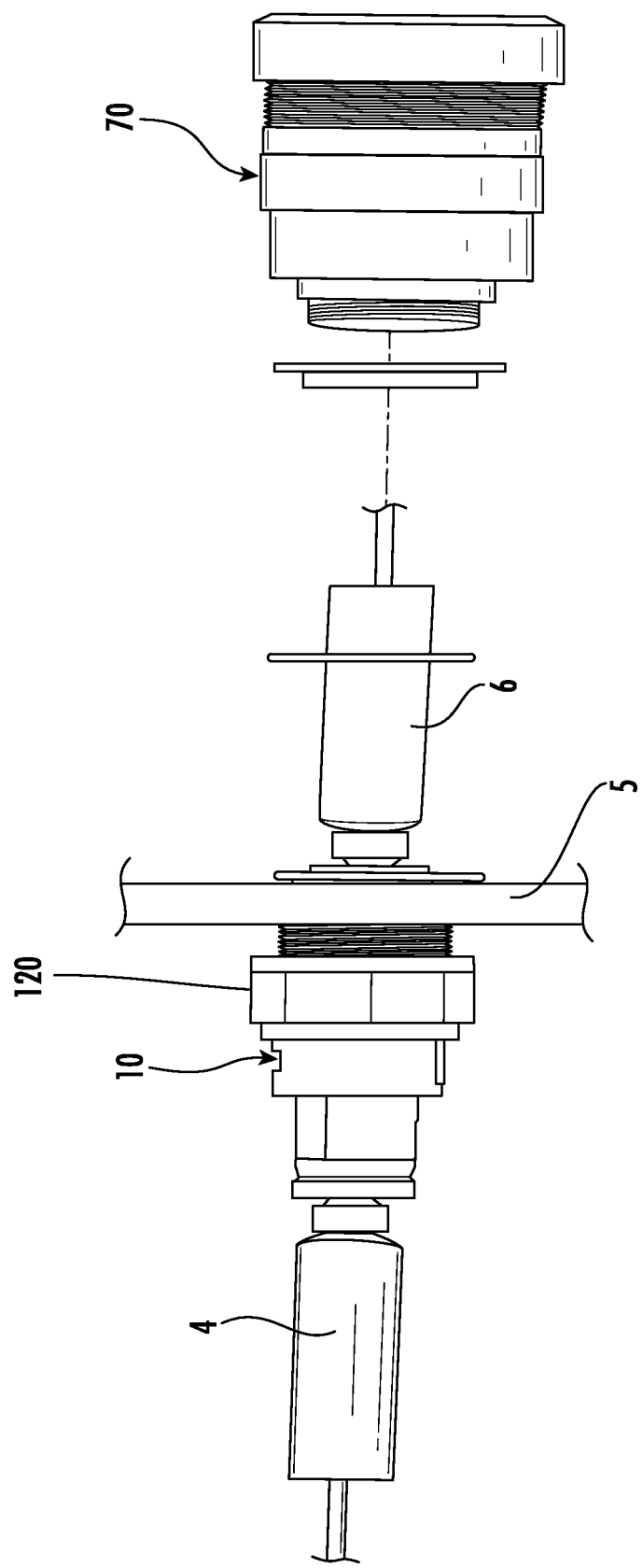
FIG. 4B is a side view of the fiber optic connector assembly of FIG. 4A in a partially assembled state.
Figure 4C:
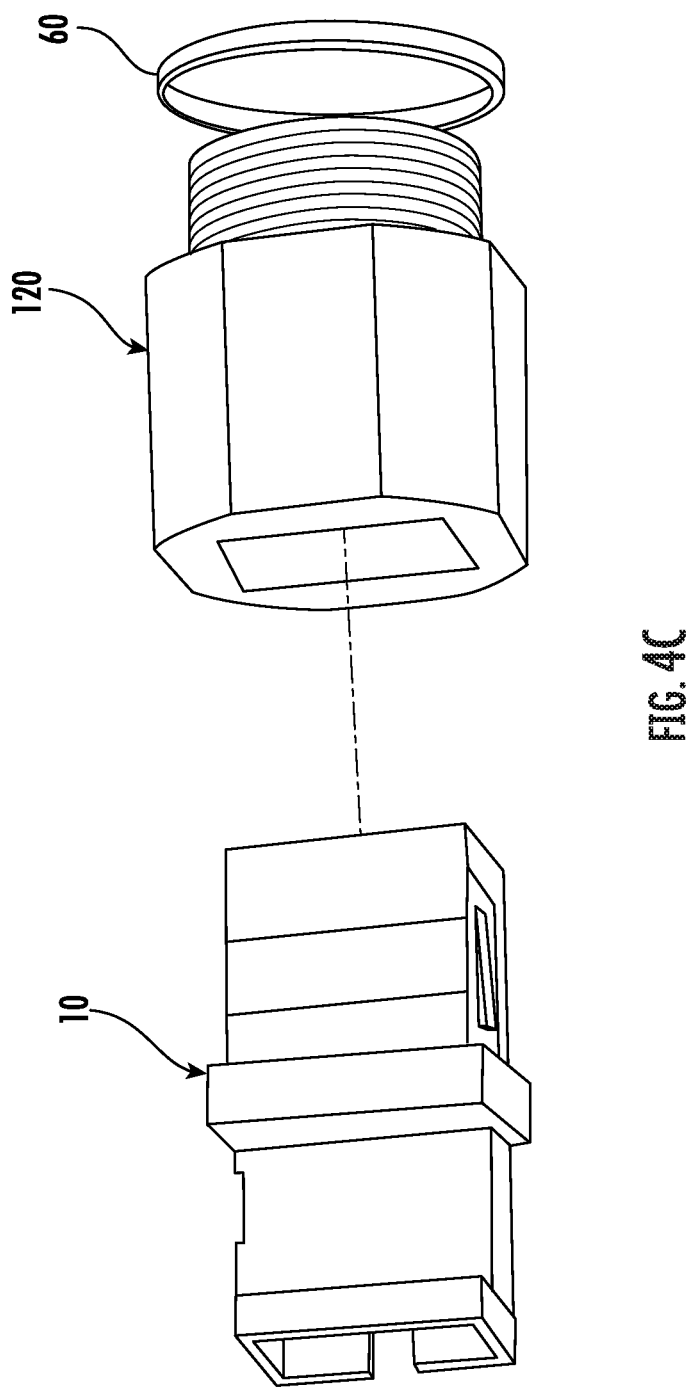
FIG. 4C is a side perspective view of a coupler and an adapter of the fiber optic connector assembly of FIGS. 4A and 4B prior to being assembled with each other.
Figure 4D:
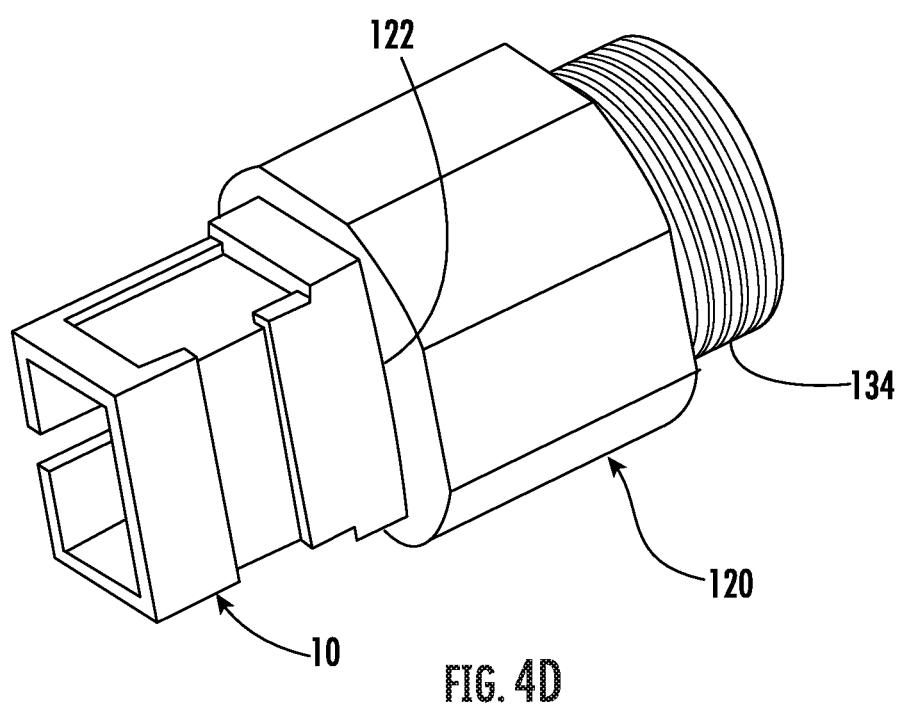
FIG. 4D is a side perspective view of the coupler and adapter of the fiber optic connector assembly of FIGS. 4A-4C.

In another embodiment of a connector assembly 102 as shown in FIGS. 4A-4D, an adapter 120 is provided for securing the coupler 10 relative to the junction housing 5. The adapter 120 is generally similar to the combination of the adapter 20 and the sleeve 30 in the embodiment of FIGS. 3A-3G in that the adapter 120 directly engages with the coupler 10 and is secured to the junction housing 5 with threading. The adapter 120 includes a first through opening 122 dimensioned to receive the coupler 10, and also includes a first threading 134 configured to matingly engage with the second threading 8 on the junction housing 5. In FIG. 4A, the left side relative to junction housing 5 is internal or inside, and the right side relative to the junction housing is external or outside; however, this configuration can be reversed. This embodiment differs from other embodiments disclosed herein in that the coupler 10 and adapter 120 are fixed to each other such that they rotate together, and once installed (i.e. the adapter 120 is screwed into the junction housing 5), then the coupler 10 is also rotationally fixed relative to the junction housing 5. The adapter 120 is metallic, which reduces EMI.

As shown in FIGS. 5A-5D, another embodiment of a connector assembly 202 is provided that includes at least one washer 65a, 65b. Although two washers 65a, 65b are illustrated, one of ordinary skill in the art would understand based on the present disclosure that varying numbers of washers, including one or more than two can be used.

In this embodiment, the washers 65a, 65b include a radial inner edge having a profile that is complementary to an outer surface of the coupler 10, and a radial outer edge that preferably that is complementary to an internal surface of the connector body 70. The radially inner edge of the washers 65a, 65b generally have a rectangular profile that mates with the outer surface of the coupler 10, adjacent to the protrusion 11. The radial outer edge of the washers 65a, 65b preferably has a circular profile and allows the washers 65a, 65b to rotate freely within the connector body 70.

Figure 5B:
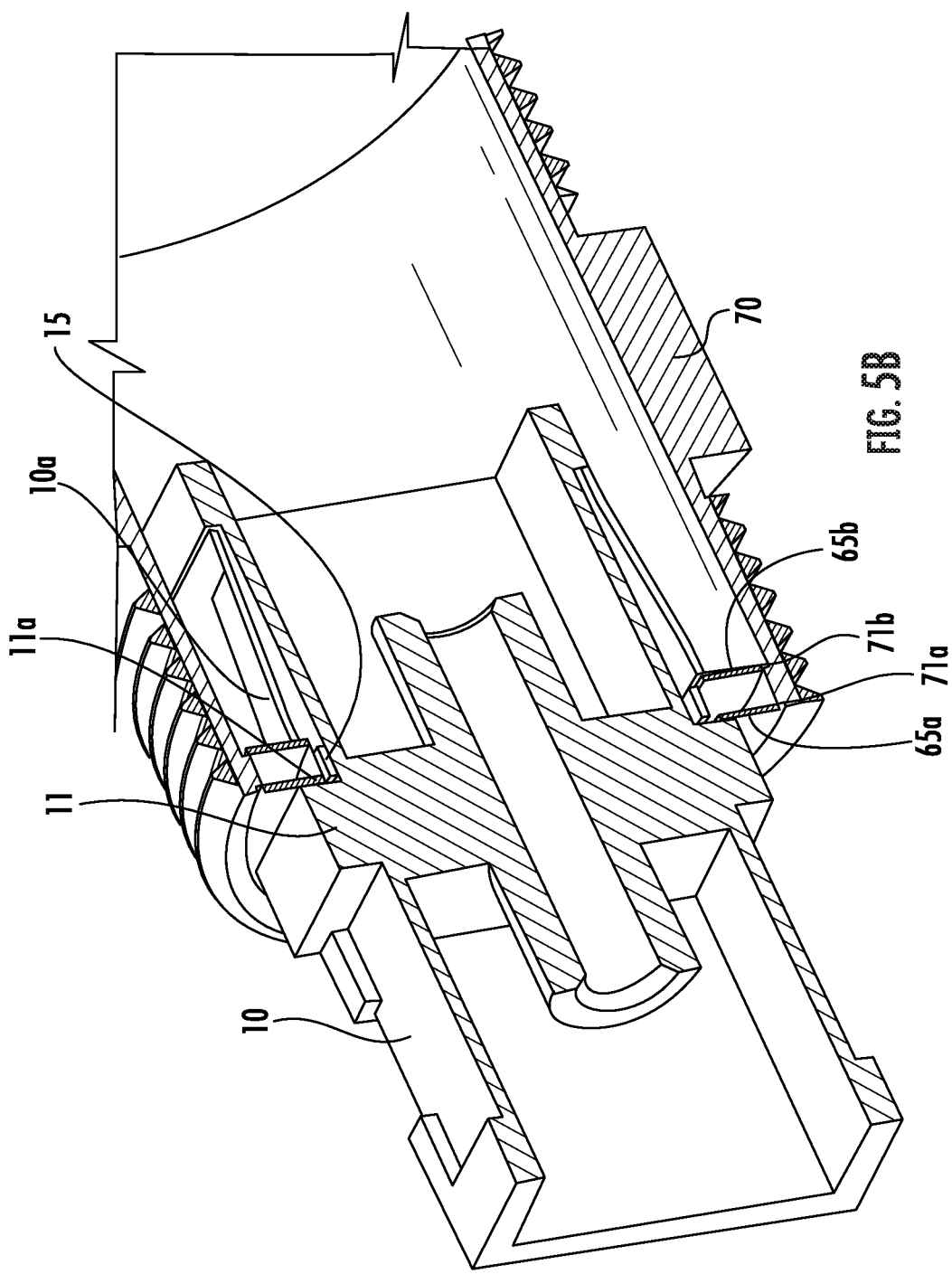
FIG. 5B is a perspective cross section view of the fiber optic connector assembly of FIG. 5A.
Figure 5C:
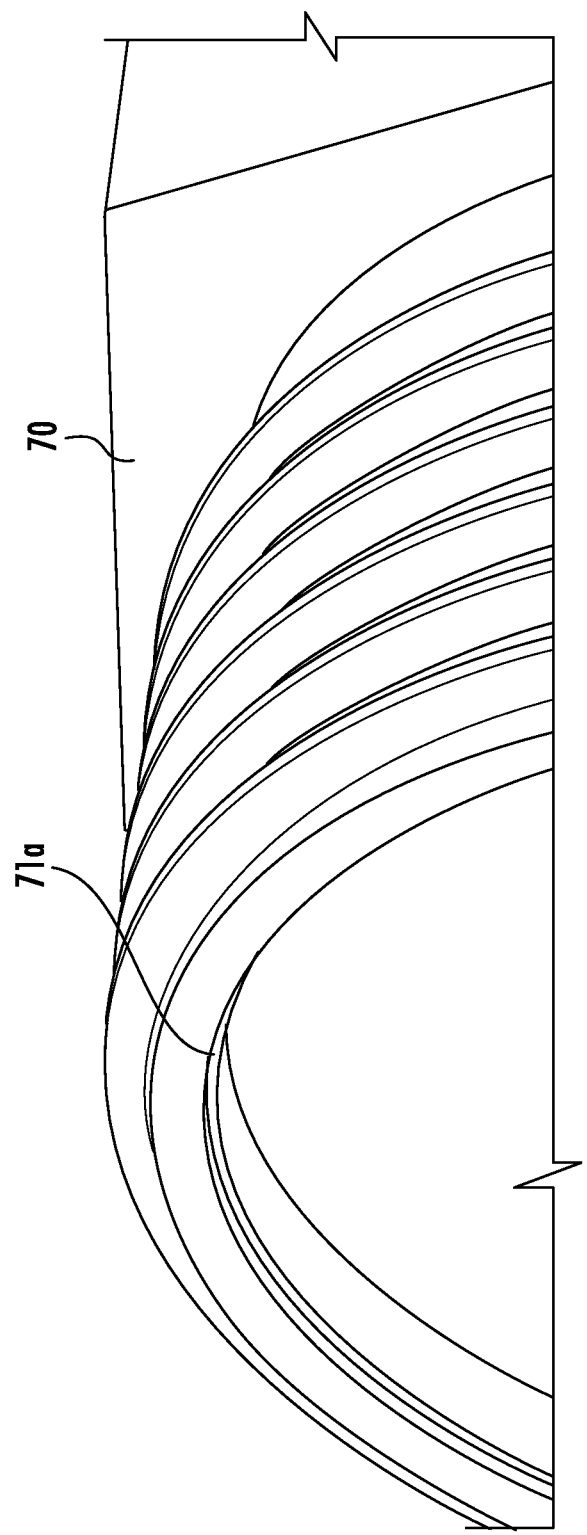
FIG. 5C is a magnified perspective view of a connector body of the fiber optic connector assembly of FIGS. 5A and 5B.
Figure 5D:
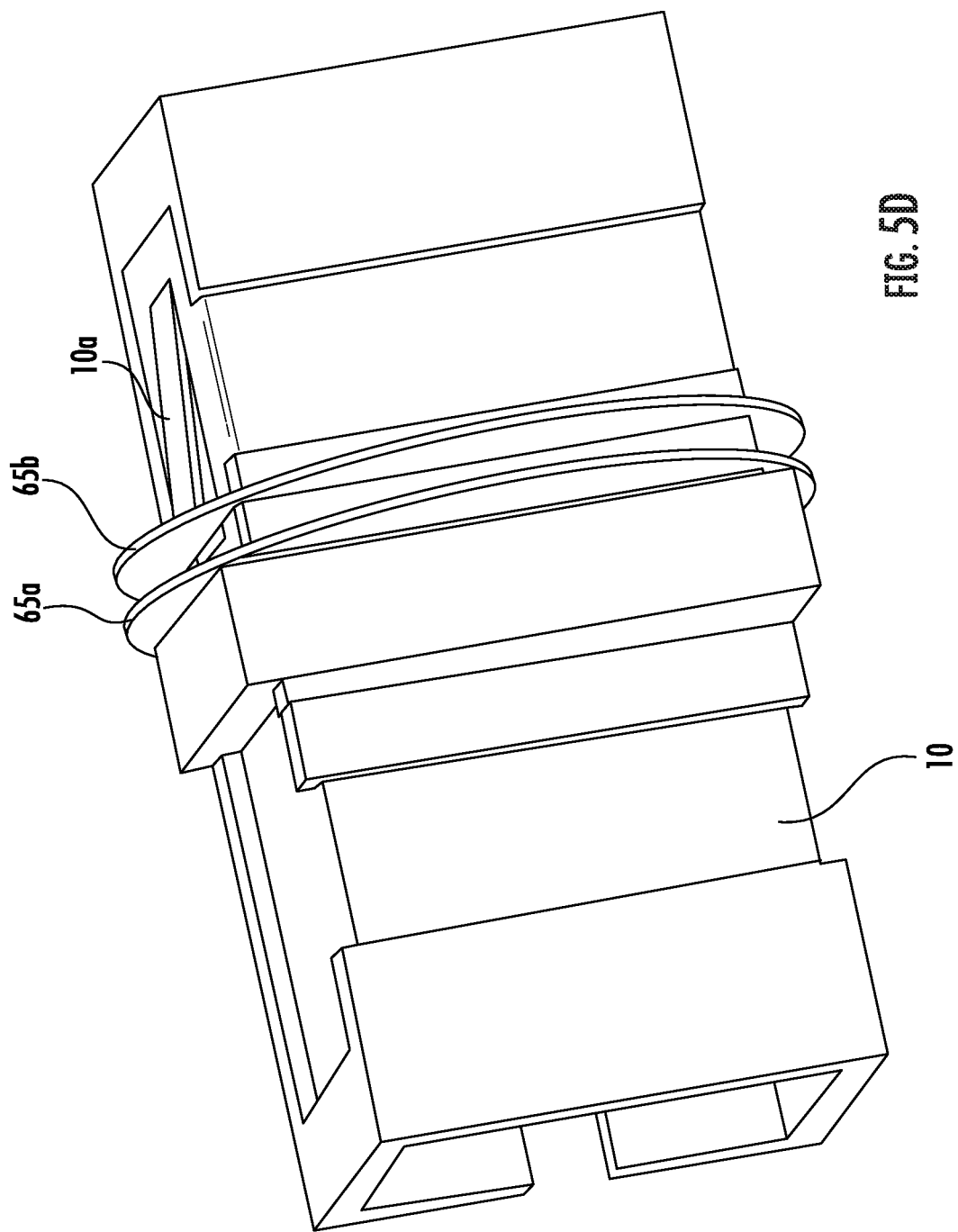
FIG. 5D is a perspective view of a coupler and washers of the fiber optic connector assembly of FIGS. 5A-5C.

In order to assemble this configuration, the first washer 65a is pressed around an outer surface of the coupler 10, after which this sub-assembly is inserted into the end of the connector body 70. Next, the second washer 65b is pressed through the connector body 70. As shown in FIG. 5B, the protrusion 11 on the coupler 10 acts as a stop for the first washer 65a, and the locking prong 10a serves as a locking clip for the second washer 65b. Once assembled, the coupler 10 is rotatable relative to the connector body 70 due to the washers 65a, 65b.

The connector body 70 includes two shoulders 71a, 71b that are configured to engage with a respective one of the washers 65a, 65b. A spacing ring 15 surrounding the coupler 10 can be provided between the washers 65a, 65b. This arrangement utilizes standard portions of the coupler 10, i.e. the protrusion 11 and locking prong 10a, to position and secure the washers 65a, 65b in place together with the connector body 70.

In one embodiment, the washers 65a, 65b are metallic. In another embodiment, the washers 65a, 65b are formed from beryllium copper. In one embodiment, the washers 65a, 65b have a flat, disc-like profile and have a thickness no greater than 0.010 inches.

Based on the arrangement of the washers 65a, 65b, the coupler 10, which is fixed to the fiber optic cable ends 4, 6, is rotatable relative to the connector body 70. Permitting the coupler 10 to rotate during installation reduces torque and torsional forces which can damage the fiber optic cables during assembly.

Figure 6A:
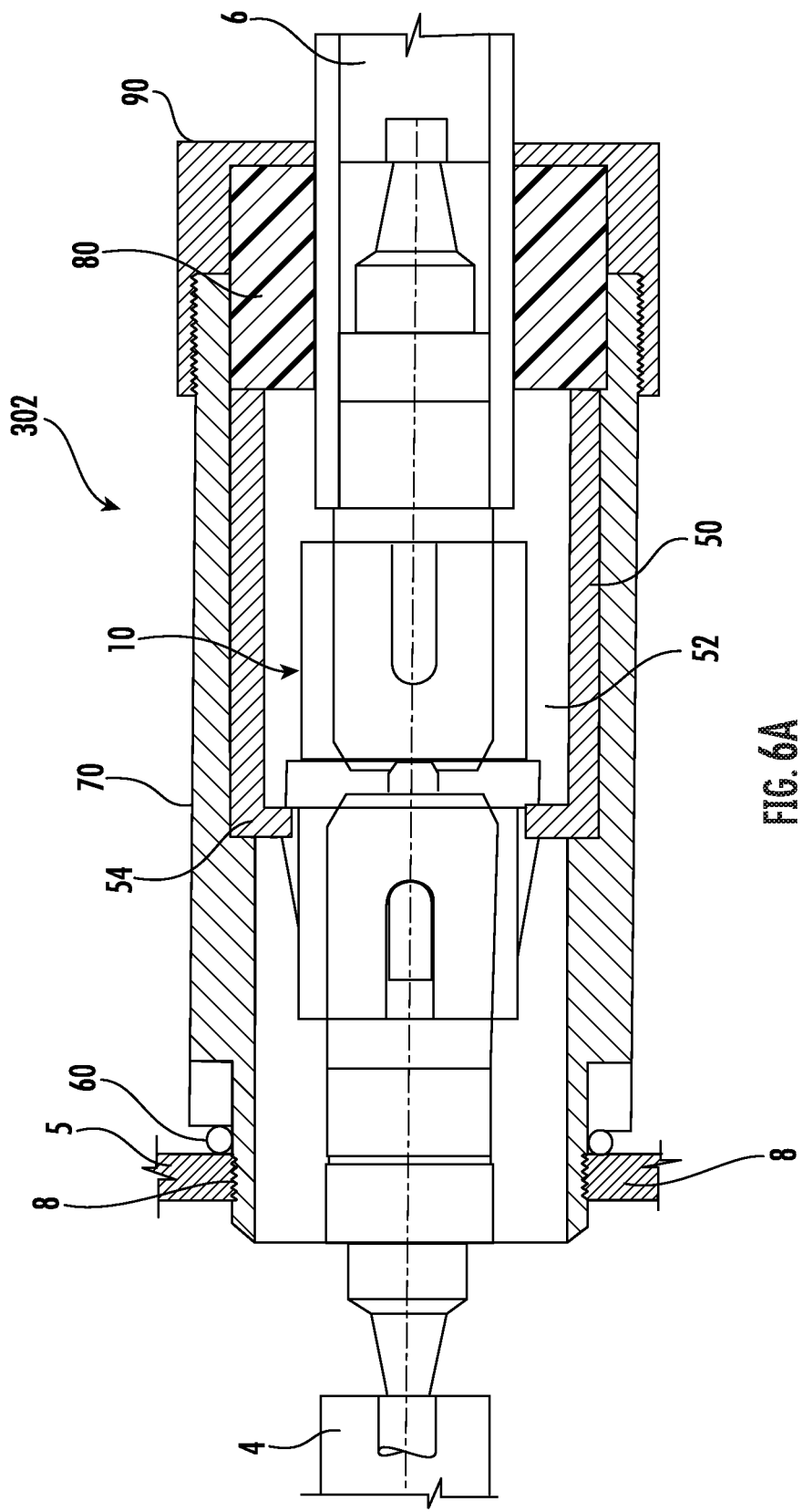
FIG. 6A is a cross section view of a fiber optic connector assembly with a fiber optic cable connected to the coupler according to another embodiment.
Figure 6B:
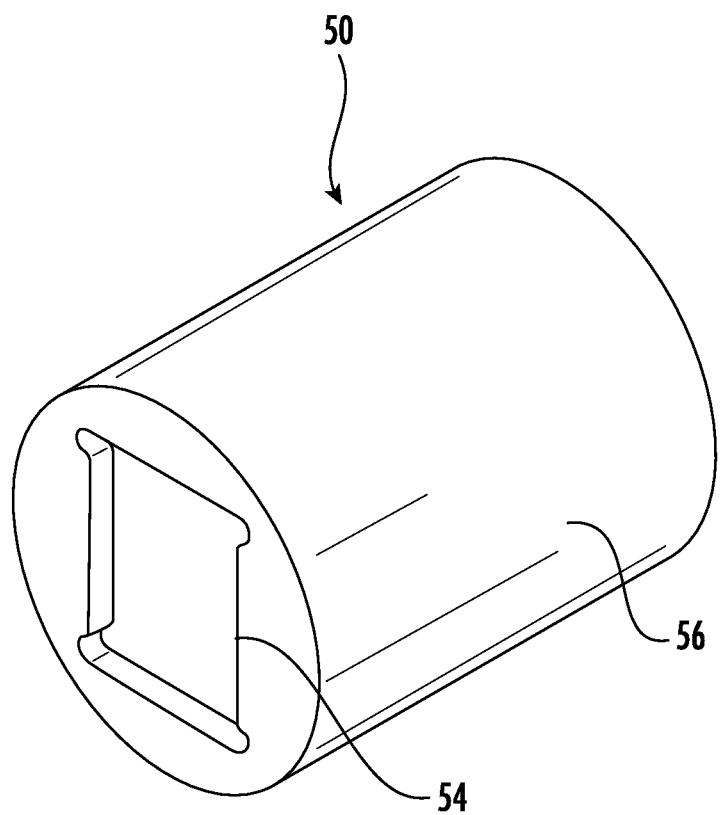
FIG. 6B is a perspective view of the rotational clip of the fiber optic connector assembly of FIG. 6A.

Another fiber optic connector assembly 302 is illustrated in FIGS. 6A and 6B. In this embodiment, a rotational clip 50 is provided that defines an opening 52 dimensioned to receive the coupler 10 and a smooth outer surface 56 (which interfaces with an internal surface of the connector body 70). The rotational clip 50 includes a radially inwardly extending flange 54 configured to engage with an outer surface of the coupler 10 such that the coupler 10 and the rotational clip 50 are fixed rotationally such that the coupler 10 and the rotational clip 50 rotate together. The rotational clip 50 is dimensioned to be inserted within the connector body 70 that is fixed to a junction housing 5, such that the rotational clip 50 is rotatable relative to connector body 70. The embodiment of FIGS. 6A and 6B is functionally similar to the embodiment of FIGS. 3A-3G. The rotational clip 50 is preferably metallic to reduce EMI.

The rotational clip 50 is arranged external from the junction housing 5 and allows for a "quick connect" attachment with the opening in the junction housing 5. Further, the rotational clip 50 permits rotation of the coupler 10, which is fixed to the fiber optic cable ends 4, 6, relative to the connector body 70 during installation, thus reducing torque on the fiber optic cables.

Sealing rings or O-rings 60 can be provided in each of the embodiments to improve sealing between adjacent interfacing components.

The embodiments disclosed herein overcome issues regarding EMI and unwanted RF signals by using metallic components as part of the fiber optic connector assembly, as well as weatherized components to protect against unwanted interference or damage to the fiber optic connector assembly. The embodiments disclosed herein are "quick connect," which allows the assemblies to be installed without requiring any splicing or polishing of the fiber optic cable. This results in a much less challenging installation, thus requiring a less training of and experience and sophistication of a technician and less complicated tools and equipment to complete the installation. The installation process using the connector assemblies disclosed herein is much quicker, easier, and cheaper than existing installation methods and assemblies. The embodiments disclosed herein also provide a sealed receptacle for the coupler 10 that is weather proof.

In the cross sectional views provided herein, the coupler 10 is sometimes illustrated inside or outside of the junction housing 5. One of ordinary skill in the art would understand that the exact configuration relative to the junction housing 5 can be adjusted depending on the specific requirements associated with a particular installation.

The embodiments disclosed herein also allow for installation personnel to attach the fiber optic connector assemblies to the junction housings 5 without having to physically open the junction housing 5 or access internal components, which requires specialty tools and equipment. Based on the configurations disclosed herein, the assembly is much less complicated and less training is required for installation personnel.

One of ordinary skill in the art would understand based on the present disclosure that the assemblies disclosed herein can be used in varying sized junction housings and associated bungholes. Depending on the specific size of an opening or bunghole in a junction housing, a reducer can be used to adapt any of the assembly components to openings or bungholes of varying sizes. Any of the embodiments can be used directly with a $^{13}/_{16}$-24 size opening or a $^{5}/_{8}$-24 size opening, specifically with the use of a reducer.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A fiber optic connector assembly comprising:
   a coupler configured to lockingly engage a first fiber optic cable end and a second fiber optic cable end;
   an adapter defining a first through opening in which the coupler is arranged;
   a sleeve defining a second through opening dimensioned to receive the adapter, the sleeve including a first threading on an axial end, the first threading being configured to matingly engage with a corresponding second threading defined within an opening of a junction housing; and a retention assembly provided between the adapter and the sleeve, the retention assembly axially fixing the adapter relative to the sleeve such that the adapter is rotatable relative to the sleeve, the retention assembly comprising a circumferential groove defined on the adapter;

wherein a radially outer surface of the adapter includes a projection positioned within the circumferential groove, and the projection is configured to limit relative rotation between the adapter and the sleeve.

2. The fiber optic connector assembly of claim 1, wherein in a partially installed state, the sleeve is fixed within the junction housing via the first threading matingly engaging with the second threading, and at least the coupler and the adapter are is rotatable relative to the sleeve and the junction housing.

3. The fiber optic connector assembly of claim 2, wherein in the partially installed state, a majority of the fiber optic connector assembly is external from the junction housing.

4. The fiber optic connector assembly of claim 2, further comprising:

a connector body including a first axial end abutting the axial end of the sleeve and including a third threading configured to engage the second threading defined within the opening of the junction housing, and a second axial end extending away from the first axial end; and a cap and a seal configured to engage the second axial end of the connector body;

wherein in a fully installed state, the seal is arranged within a radial space defined between at least one of the fiber optic cable ends and a radially inner surface of the connector body, and the cap is fastened to the second axial end of the connector body.

5. The fiber optic connector assembly of claim 1, wherein at least one of the adapter or the sleeve are metallic.

6. The fiber optic connector assembly of claim 1, wherein the retention assembly consists of:

a through hole defined on the sleeve; and a fixing element extending within both the circumferential groove and the through hole.

7. The fiber optic connector assembly of claim 6, wherein the circumferential groove has a non-uniform circumferential profile.

8. The fiber optic connector assembly of claim 1, wherein the projection restricts a degree of relative rotation between the adapter and the sleeve.

9. The fiber optic connector assembly of claim 1, wherein the coupler and the adapter are fixed to each other such that the coupler and the adapter rotate together.

10. The fiber optic connector assembly of claim 1, wherein the coupler is a female-to-female coupler.

11. The fiber optic connector assembly of claim 1, wherein a radially inner surface of the adapter is cylindrical.

12. The fiber optic connector assembly of claim 1, wherein the axial end of the adapter is configured to axially abut against an axial end of a connector body arranged within the opening of the junction housing that defines the second threading.

13. The fiber optic connector assembly of claim 1, wherein a medial region of the coupler includes a protrusion, and the coupler abuts the protrusion.

14. The fiber optic connector assembly of claim 13, wherein the adapter is axially retained between the protrusion formed on the coupler and a shoulder formed on an internal surface of the sleeve.

15. A fiber optic connector assembly comprising:

a coupler configured to lockingly engage a first fiber optic cable end and a second fiber optic cable end; and at least one washer including a radially inner edge having a profile complementary to an outer surface of the coupler, and a radially outer edge having a circular profile and adapted to be freely rotatable within a connector body configured to be securable within an opening of a junction housing;

wherein the at least one washer includes a first washer and a second washer, the first washer is axially secured between a protrusion formed on the coupler and a first shoulder formed on the connector body, and the second washer is axially secured against a locking clip formed on the coupler and a second shoulder formed on the connector body.

16. A fiber optic connector assembly comprising:

a coupler configured to lockingly engage a first fiber optic cable end and a second fiber optic cable end; and a rotational clip defining a through opening dimensioned to receive the coupler, the rotational clip including a radially inwardly extending flange configured to engage with an outer surface of the coupler such that the coupler and the rotational clip are fixed to each other and the coupler and the rotational clip rotate together, the rotational clip being dimensioned to be inserted within a connector body that is fixed to a junction housing such that the rotational clip is rotatable relative to connector body and the junction housing.

* * * * *